United States Patent [19]

Codner, Jr.

[11] 3,730,150
[45] May 1, 1973

[54] METHOD AND APPARATUS FOR CONTROL OF VALVE OPERATION

[76] Inventor: Stephen J. Codner, Jr., 4976 Derby Place, Newark, Calif. 94560

[22] Filed: Oct. 20, 1971

[21] Appl. No.: 190,919

[52] U.S. Cl................................123/90.18, 123/90.20
[51] Int. Cl............................F01l 1/34, F01l 11/00
[58] Field of Search..........................123/90.18, 90.20

[56] References Cited

UNITED STATES PATENTS

| | | | |
|---|---|---|---|
| 2,969,051 | 1/1961 | Webster | 123/90.18 |
| 2,980,089 | 4/1961 | Sampietko | 123/90.18 |
| 3,633,554 | 1/1972 | Nakasima | 123/90.18 |
| 3,481,314 | 12/1969 | Crenn | 123/09.18 |
| 3,638,624 | 2/1972 | O'Grady | 123/90.18 |

*Primary Examiner*—Laurence M. Goodridge
*Assistant Examiner*—Ronald B. Cox
*Attorney*—Paul D. Flehr et al.

[57] ABSTRACT

An internal combustion engine with means to selectively control valve operation to achieve improved operating efficiency resulting in decreased exhaust pollution, added power and faster acceleration, easier start-up, and smoother idle. The amount of valve lift duration and overlap between the exhaust and intake valves is controlled in one embodiment by means of selectively axially shifting a camshaft formed with lobes contoured with ramp surfaces which vary in axial extent. Shifting of the cam carries the lobes into operating relationship with their associated valve operating means so that in one position a predetermined lobe ramp contour produces a relatively short overlap period for optimum engine operation at start-up, idling and low speed conditions, and at progressively axial spaced camshaft positions varied lobe ramp contours are moved into operating relationship with the cam followers to cause an increase in valve overlap for optimum operation at high speed engine conditions.

1 Claim, 14 Drawing Figures

Patented May 1, 1973
3,730,150
4 Sheets-Sheet 1
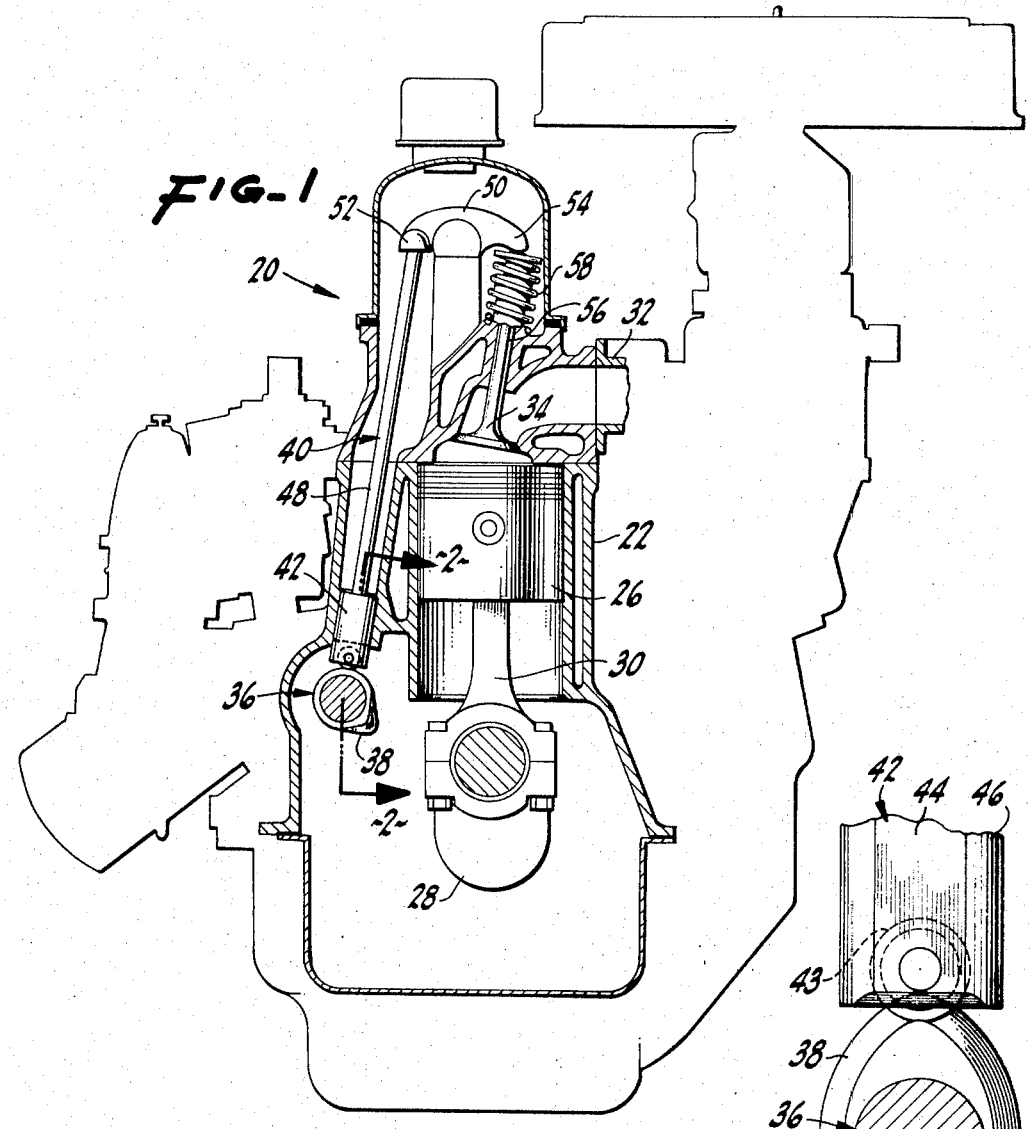
FIG. 1
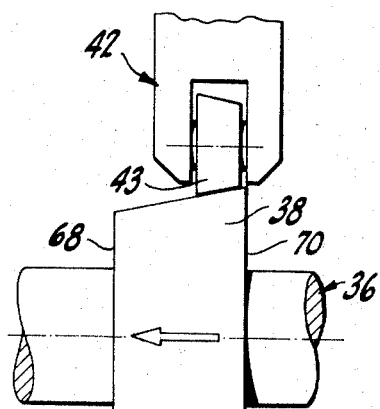
FIG. 2
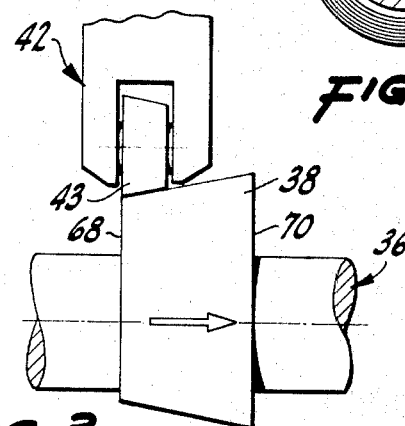
FIG. 3
FIG. 4

Patented May 1, 1973

METHOD AND APPARATUS FOR CONTROL OF VALVE OPERATION

BACKGROUND OF THE INVENTION

This invention relates in general to internal combustion engines, and in particular relates to method and apparatus for the control of valve operation in an internal combustion engine.

In the operating cycle of conventional internal combustion engines overlap between the intake and exhaust valves associated with each cylinder is commonly provided through appropriate timing of the lift duration for the inlet and exhaust valves. Thus, it is known to grind the camshaft lobes with predetermined contours such that the charge inlet valve is opened a selected number of degrees of crankshaft rotation before top dead center (hereafter TDC) while closure of the exhaust valve is delayed for a certain number of degrees after TDC. The duration and overlap periods at which both valves are open are designed to overcome in part the effects of gas friction and inertial forces of both the intake and exhaust flows. It is known that faster piston speeds require higher flow velocities to fill the combustion chamber with an adequate fuel/air charge, and to more completely scavenge it of the exhaust gasses. Because of the increased friction and inertial forces at these higher velocities, the inlet valve must begin to open before the piston reaches the end of its exhaust stroke at TDC, and then close after BDC (Bottom Dead Center), for increased charge induction. Similarly, for increased exhaust scavenging the exhaust valve must begin to open before the piston reaches the end of its power stroke at BDC, and then close after TDC.

Theoretically the duration or time period of lift for both the intake and exhaust valves should be increased as engine speeds increase. Thus, inlet valve closure should be delayed for a certain number of degrees after BDC to take advantage of the inertia of the incoming flow of charge for increased power. And the exhaust valve should open considerably before BDC to take advantage of the effects of blow down by which the residual pressure blows the exhaust gases out. This permits the cylinder pressure to fall substantially to atmospheric before the exhaust stroke begins, otherwise the piston would expend energy on its upward stroke in working against the residual pressure. However, at relatively low engine speeds a cam grind with the same duration periods results in poor performance. At low speeds the late inlet valve closing reduces power because of the loss of part of the incoming charge back through the inlet during compression, and the extreme advance of exhaust opening reduces the effective length of stroke during which the expanding gasses act against the piston.

In conventional engines the valve timing and resulting duration and overlap periods are at best a compromise because of fixed cam contours. A cam grind must be selected for a particular engine application which establishes fixed values of lift, duration and overlap. The characteristics of cam action will thus be optimum for only a narrow range of engine speed. Thus, a cam grind can provide particular duration and overlap periods which establishes the most efficient charge induction and exhaust scavenging for a given engine speed, for example high speed operation with maximum torque. However, at low engine speed with the same duration and overlap periods combustion efficiency is seriously compromised as a result of factors such as intake cross-over and blow-out of the exhaust port. With the throttle nearly closed the resulting low pressure in the inlet system tends to draw the exhaust products back into the engine during the overlap period. The start-up, idle and low speed performance is relatively poor with incomplete combustion and increased pollution. Similarly, where a cam grind provides optimum valve operation at low speeds, then the same engine would perform poorly at higher speeds.

It is also known that the valve float occurring at high engine speeds from the inertial forces of the moving valve elements adversely affects engine performance. Valve float results in the valve not following exactly the cam contour so that charge induction and exhaust flow approach an uncontrolled state. It is known that the provision of longer lift duration permits the engine to run at relatively higher speeds before valve float starts. Longer duration has the effect of spreading the valve acceleration force impulse over a longer time period. However, such an engine would not run well at lower speeds because lift duration is conventionally fixed in relation to engine cycle time.

Conventional valve operating mechanisms play a part in contributing to air pollution because the engine produces unburned exhaust products where valve operating characteristics are not optimum throughout the speed range of the engine. At the theoretical ratio of about 14.7 lbs of air per lb of fuel all of the fuel would be consumed and there would be no unburned hydrocarbons or carbon monoxide in the exhaust. However, conventional engines do not perform well at the theoretical air-fuel ratio, and richer mixtures must be used varying anywhere from 12 to 1 in standard engines to 14 or 14.5 to 1 in high performance engines. Because of the increasing recognition of the effects on air pollution from internal combustion engines, it has become increasingly desirable to provide an engine which will perform satisfactorily closer to the theoretical air-fuel ratio throughout the entire speed range of the engine.

OBJECTS AND SUMMARY OF THE INVENTION

It is a general object of the invention to provide method and apparatus for controlling valve operation in an internal combustion engine which is productive of optimum engine performance throughout the speed range of the engine, and which will decrease the amount of unburned exhaust constituents by providing more efficient combustion.

Another object is to provide method and apparatus for controlling the operation of an internal combustion engine in which the valve duration and overlap periods are varied in a predetermined manner to provide optimum intake and exhaust valve action which is closely matched to the charge induction and exhaust scavenging requirement of the engine.

Another object is to provide method and apparatus in an internal combustion engine to vary the valve duration and overlap periods responsive to a change in engine speed so that optimum charge induction and exhaust scavenging is obtained for increased engine efficiency and reduced unburned exhaust components.

Another object is to provide method and apparatus of the type described in which the overlap period between intake valve opening before TDC and exhaust valve closure after TDC is controlled to vary between a relatively small overlap period for start-up, idle and low-engine speed operation and a relatively long overlap period for high speed operation.

Another object is to provide method and apparatus of the type described in which the intake and exhaust valves are operated by a mechanism which includes a cam shaft having lobes formed with peripheral ramp surfaces in which the ramp contour varies in axial extent and with means to axially shift the cam shaft to bring selected contours of the lobe into operating relationship with associated cam followers to provide predetermined duration and overlap periods matching desired engine performance.

The method of the invention is carried out with an internal combustion engine having combustion chambers with associated intake and exhaust valves operated by valve actuating means controlling the periods of valve lift duration. In the method portions of the lift durations of the intake and exhaust valves are caused to coincide for a predetermined overlap period. The valve duration and overlap periods are varied in accordance with a change in engine speed to provide an increase or decrease in the duration and overlap periods responsive to respective increasing or decreasing engine speed.

In the apparatus an internal combustion engine is provided with intake and exhaust valve operation means to open respective intake and exhaust valves for a predetermined lift duration time. Valve control means is provided to cause portions of the duration times of the intake and exhaust valves to coincide for an overlap period, and this overlap period is varied in time as a function of engine speed. In the preferred embodiment of the apparatus an axially shiftable camshaft is provided with lobes which are formed with peripheral ramp surfaces having ramp contours which vary in axial extend between one predetermined path for engine start-up, idle, and low engine speed operation and another ramp contour for relatively high speed engine operation. Means are provided to shift the camshaft axially between one position in which the low speed ramp contours are moved into operating relationship with associated cam followers and another position in which the high speed ramp contours are moved into operating relationship with the cam followers. The ramp surfaces of the lobes are tapered between their extreme ramp contours with tapered rollers carried on the cam followers formed to generally conform with the lobe ramp surfaces. The means axially shifting the camshaft comprises a mechanical fork shift in one embodiment, or an hydraulic actuator in another, adapted to shift the camshaft to a selected position providing the optimum lift duration and overlap period which matches the requirements of the engine running under given load and speed conditions.

The foregoing and other objects and features of the invention will be become apparent to those skilled in the art from the following specification taken together with the accompanying drawings.

BRIEF DESCRIPTION OF THE DRAWINGS

FIG. 1 is a cross sectional elevational view of an internal combustion engine of the invention:

FIG. 2 is a fragmentary sectional view taken along the line 2—2 of FIG. 1 illustrating one operating position of the axial sliding camshaft thereof;

FIG. 3 is a view similar to FIG. 2 illustrating another operating position of the camshaft;

FIG. 4 is an enlarged fragmentary view of the engine of FIG. 1 illustrating one lobe of the cam shaft moving its associated follower to a high lift position;

DETAILED DESCRIPTION OF THE INVENTION

Figure 6:
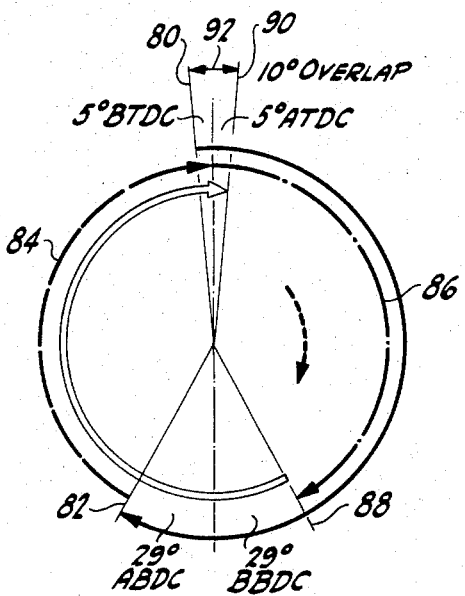
FIG. 6 is a valve timing chart of a representative engine incorporating applicant's invention at relatively low engine speed operation.

In the drawings FIG. 1 illustrates generally at 20 a six-cylinder oversquare engine incorporating a preferred embodiment of applicant's invention adapted for carrying out the method of controlling valve duration and overlap to match the requirements of charge induction and exhaust for optimum engine performance. While the invention of this embodiment will be explained in relation to such a six-cylinder oversquare engine, it will become apparent from the following that the invention will find application in all types of internal combustion engines in which the flow of the intake charge and exhaust gasses into and from a combustion chamber are controlled by intake and exhaust valves. Thus, the invention can be used with various engine designs such as inline, radial or V-type cylinder arrangements, L-head, F-head, or overhead cam arrangements, engines of either four-stroke or two stroke cycle design, or with engines utilizing either carburetion of fuel injection (e.g. diesel).

The exemplary engine 20 comprises a cylinder block 22 formed with an inline row of cylinders carrying reciprocating pistons 26 which in turn drive a crankshaft 28 through connecting rods 30. An intake manifold 32 directs a carburetted charge into the combustion chamber of the cylinder when poppet-type inlet valve 34 is moved from its valve seat to open position. Similarly, an exhaust manifold, not shown, is provided to direct the flow of exhaust gases from the chamber when the associated exhaust valve, not shown, is moved from its seat to open position.

The valve train for controlling valve operation includes a camshaft 36 formed with a plurality of lobes 38, 39 positioned in operating relationship with respective cam follower means or lifter assembly 40. The lifter assembly 40 will be explained in relation to its function in opening and closing one of the intake valves 34, and it is understood that the construction and operation of the cam follower means for the remaining intake and exhaust valves is similar thereto.

Cam follower 40 includes a roller tappet 42 mounted for axial sliding movement in a bore formed in the engine block immediately above a respective lobe of the cam shaft. A tapered roller 43 is mounted on an axle positioned in the lower clevis portion of each tappet. Tappet 42 is guided or constrained within its bore by suitable means to prevent rotational movement within the bore. FIG. 4 illustrates an arrangement in which flat sides 44, 46 define an hexagonal tappet body which is keyed within a hexagonal bore to permit reciprocating, but not rotational, motion. Alternatively, an alignment bar as shown in U.S. Pat. No. 3,108,580 may be provided between adjacent tappets. The important consideration is to ensure that the rollers 43 of each tappet are free to rotate about an axis which remains substantially parallel to the rotational axis of the camshaft. A push rod 48 is connected with each tappet and extends upwardly to a rocker arm 50 which is provided with a socket 52 accepting the ball end of the push rod. The rocker arm is mounted about a pivot bearing with an arm 54 projecting against the end of valve stem 56 which is slidably mounted within a valve sleeve in the cylinder head. A return spring 48 is connected with the valve stem to normally urge the valve upwardly to its seated position. A suitable camshaft drive arrangement, such as intermeshing gears, not shown, on the crank and camshafts is provided to drive camshaft 36 at one half the crankshaft speed. To accept the axial shifting motion of the camshaft, the gear for the camshaft can be mounted on a suitable spline fitting formed on the camshaft permitting the latter to rotate with but axially slide relative to the cam gear. Alternatively, the relative axial motion may be accommodated for by forming the teeth of either of the crank or cam gears of a width sufficient to accept the range of axial travel while remaining in meshing engagement. Similarly, where the drive for accessory equipment, such as an oil pump or distributor, is taken from a gear on the camshaft, a suitable spline arrangement can be provided to afford relative axial sliding movement of the camshaft with respect to the accessory drive gear.

Figure 11:
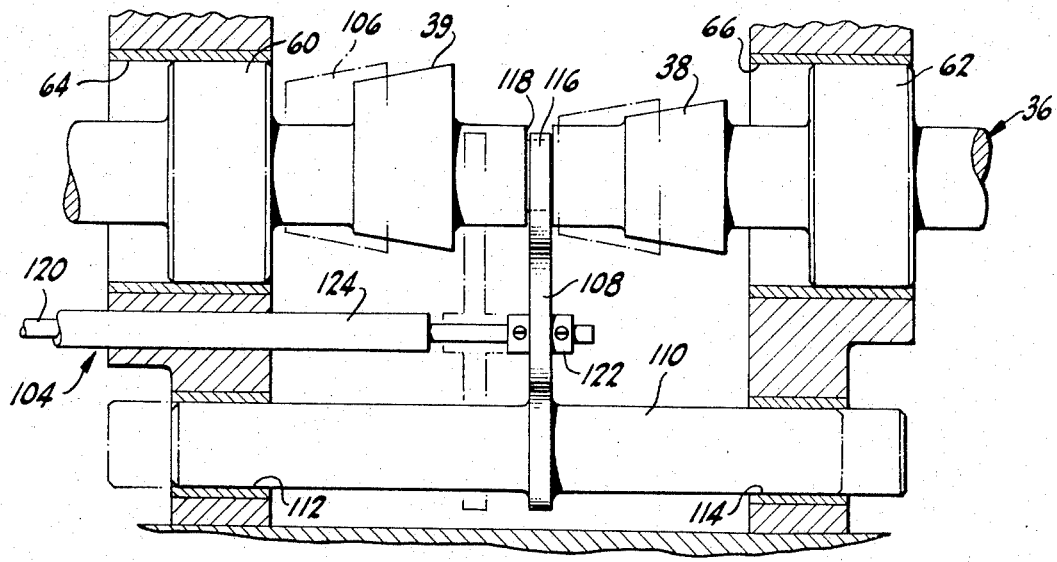
FIG. 11 is a fragmentary axial sectional view of elements of the engine of FIG. 1 providing a shift fork mechanism for moving the camshaft to selected positions.

Camshaft 36 is mounted for axial sliding movement within the crankcase along a direction substantially parallel to the crankshaft axis by the arrangement illustrated in FIG. 11. The camshaft is ground with a plurality of axially spaced journal bearings 60, 62 which are mounted for rotatable and axial sliding movement within sleeve bearings 64, 66 fitted within bores formed in the block. The camshaft is ground so that one or more pairs of the lobes 38, 39 are positioned between adjacent pairs of the journal bearings. In the illustrated embodiment the lobe 38 controls the intake valve of one cylinder while the lobe 39 controls the exhaust valve associated with that cylinder.

Each of the intake and exhaust valve operating lobes on the camshaft are ground with a predetermined peripheral ramp surface which varies in axial extent between a first ramp contour following a predetermined path which is optimum for start-up, idle and low speed engine operation and a second ramp contour following another predetermined path which is optimum for high speed engine operation. The ramp surface for the exemplary intake valve lobe 38 is best illustrated in FIGS. 2-4. The peripheral surface of this lobe is ground with a generally oblated ellipsoidal configuration in lateral cross section and which also generally tapers axially from the end 68 of small circumference to the end 70 of a relatively larger circumference. The peripheral surface of the lobe adjacent small end 68 defines the first ramp contour which is effective to operate the intake valve with a relatively short lift duration period, and the ramp surface adjacent the large end 70 is effective to operate the intake valve for a relatively long duration period. Similarly, the lobe 39 for the associated exhaust valve is ground with a ramp surface which varies in axial extent to effect a change in lift duration period from the exhaust valve. The contours of an associated pair of intake and exhaust lobes 38, 39, are formed at a predetermined angular relationship on the camshaft so that the intake and exhaust duration periods are coordinated. Thus, portions of the duration period for the intake and exhaust valves would be caused to coincide for an overlap period between the end of the exhaust stroke and the beginning of the intake stroke. Axial shifting of the two lobes 38, 39 relative to their associated cam follower means or tappets is thus effective to vary both lift duration periods for each intake and exhaust valve and in addition vary the overlap period by establishing the extent to which the intake and exhaust duration periods coincide. Axial shifting of the camshaft to selected positions moves the lobes with respect to their associated cam followers so that the ramp contour desired for a particular engine speed turns against the tappet roller 43. Positioning of the camshaft at progressive positions between its extreme limits of travel carries progressively varied ramp contours into operating relationship with the tappet roller making it possible to closely match the duration and overlap periods for optimum engine performance at engine speeds intermediate the previously described low and high speed conditions.

Figure 5:
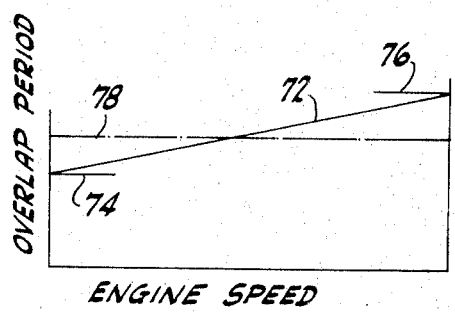
FIG. 5 is a chart illustrating valve overlap as a function of engine speed for a representative engine of conventional design and for an engine incorporating applicant's invention.

The chart of FIG. 5 illustrates the amount of valve overlap as a function of engine speed in a typical engine incorporating applicant's invention in comparison to that of a conventional engine. Line 72 depicts the ideal relationship between overlap period and engine speed.

At low speed conditions the overlap period for optimum performance ideally would have the magnitude shown at 74 with the overlap period progressively increasing for increased charge induction and exhaust scavenging up to the magnitude shown at 76 for maximum speed conditions. Conventional engines, on the other hand, have an overlap period which is constant regardless of engine speed, as depicting at line 78. Thus, it is seen that there is only one engine speed at the point where the two lines intersect where conventional engines provide the correct theoretical overlap period. At lower engine speeds the overlap period would be greater than that required for ideal performance, and at greater speeds the overlap period would be less than ideal. Applicant's method and apparatus permits valve overlap to vary with engine speed so that it correctly matches the theoretical requirements of charge induction and exhaust flows, i.e. the cam grind in the preferred embodiment is such that the overlap period follows the line 72 in the chart.

Figure 7:
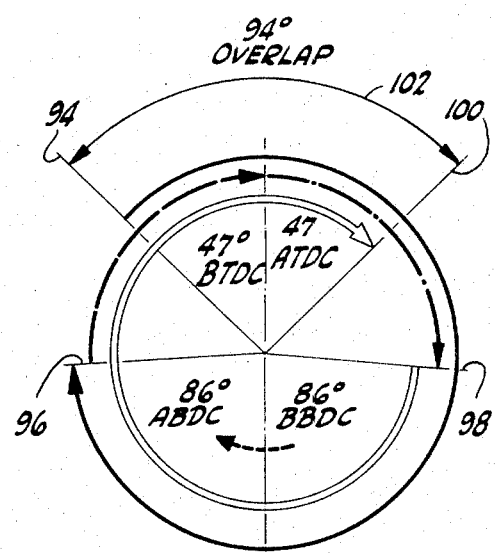
FIG. 7 is a timing chart for the representative engine incorporating applican's invention for relatively high speed engine operation.

FIG. 6 and 7 depict exemplary timing charts of an engine incorporating applicant's invention. FIG. 6 is the timing chart for low speed operation where the duration and overlap periods are relatively short, and FIG. 7 is a timing chart for high speed operation where the duration and overlap periods are relatively long. The timing for the depicted low speed operation would be effected in applicant's preferred embodiment by shifting the camshaft relative to its follower in the position illustrated in FIG. 3. At this position the inlet valve is opened at 5° BTDC (Before Top Dead Center) in degrees of crankshaft rotation, as depicted at 80. The intake valve remains open throughout the intake stroke and then closes at 29° ABDC (After Bottom Dead Center) as illustrated at line 82. Compression is illustrated at line 84 and the power stroke is illustrated at line 86. At 29° BBDC (Before Bottom Dead Center) the exhaust valve opens as illustrated at line 88. The exhaust valve remains open throughout the exhaust stroke and then closes at 5° ATDC (After Top Dead Center) as illustrated at line 90. It is seen that the overlap period at which the inlet and exhaust periods coincide comprises 10° as illustrated at 92.

The timing chart of FIG. 7 illustrates valve operation for high speed conditions. This is effected through axial shifting of the camshaft to a position carrying the lobe ramp surfaces into the operating relationship illustrated in FIG. 2. At this position the inlet valve is open at 47° BTDC, as illustrated at line 94, and remains open until it closes at 86° ABDC, illustrated at line 96. The exhaust valve is opened at 86° BBDC, illustrated at line 98, and is closed at 47° ATDC, illustrated at 100. It is seen that the overlap period has been increased to 94°, as illustrated at 102. At camshaft shift positions between the extreme limits of travel illustrated at FIG. 2 and 3 the valve duration and overlap periods are progressively varied between the limits depicted in the charts of FIG. 6 and 7.

In FIG. 11 the camshaft 36 is illustrated in a shift position for low speed operation. Camshaft shift means 104 is provided to axially shift the camshaft between the low speed position and the high speed position illustrated in phantom at 106. Shift means 104 includes a shift fork 108 projecting outwardly from and secured as by welding to an aligning shaft 110 which is mounted within sleeve bearings 112, 114 for reciprocating movement in a direction generally parallel with the axis of the camshaft. The shift fork is formed with outwardly projecting fingers 116 which extend into rotatable engagement with an annular groove 118 formed in the camshaft intermediate the lobes 38, 39. A control cable or rod 120 is connected to the shift fork by a fastener 122 and is mounted for reciprocating movement within a sheath 124. Cable 120 in turn is connected for actuation by suitable control means for moving the shift fork and camshaft back and forth to the selected position. The cable control may be operated responsive to engine speed, for example, through suitable connection with a governor-type control, or may be actuated manually. Alternatively, the camshaft could be shifted by mounting the shift fork so that its fingers project into a channel provided at the end of the camshaft in front of the timing gear or pulley, or project into a channel provided at the other end of the camshaft projecting from the cylinder block. Another shift arrangement could comprise an operating lever or arm rotatably connected with either end of the camshaft through a ball and socket joint. The force for shifting the camshaft could be electrical as by providing solenoids at each end of the camshaft with means for varying the magnetic force of the two solenoids as by variable resistors. Another arrangement would be to provide a solenoid at either end of the camshaft for applying a shifting force in one direction when energized, and with a spring and thrust washer at the other end of the camshaft for applying a return force.

Figure 12:
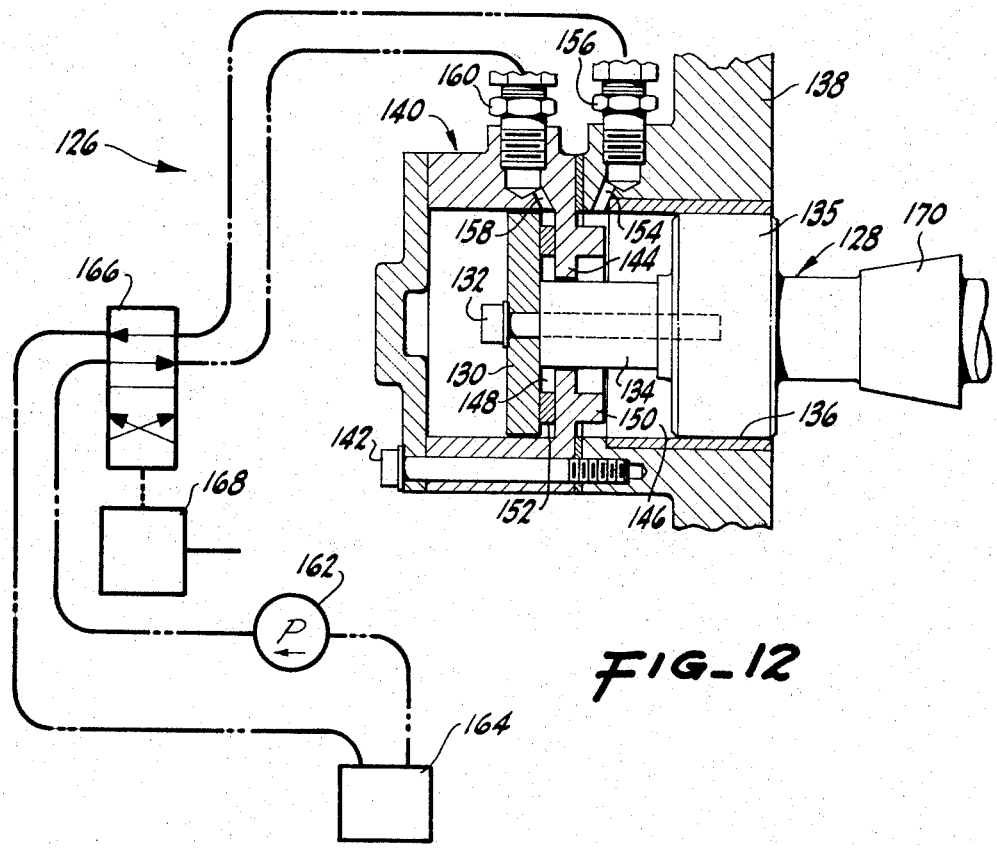
FIG. 12 is a fragmentary, partially schematic view of another embodiment of the invention providing an hydraulic actuating mechanism for axially shifting the camshaft.

FIG. 12 illustrates an embodiment of the invention providing an hydraulic actuator 126 for shifting the camshaft 128. Hydraulic actuator 126 comprises a piston 130 secured to one end of the camshaft by means of bolt 132 extending through a spacer member 134. The end journal bearing 135 of the camshaft is rotatably and slidably mounted within a sleeve bearing 136 positioned within a bore formed in cylinder block 138. The piston 130 reciprocates within a chamber formed by a housing 140 secured to the end of the cylinder block by means such as a plurality of bolts 142. An annular wall 144 of housing 140 extends inwardly intermediate the piston 130 and camshaft bearing 135 to divide the volume between these two elements into a cam return chamber 146 and a cam advance chamber 148. An annular boss 150 projects from wall 144 to abut with the end of camshaft bearing 135 limiting its outward travel, and a thrust ring 152 is secured to the other side of wall 144 to abut against the face of piston 130 to limit its inward travel. A channel 154 provides communication between a fitting 156 and chamber 146, and a channel 158 provides communication between a fitting 160 and chamber 148.

The hydraulic control arrangement for actuator 126 is illustrated schematically. Fluid is supplied under pressure by a suitable pump 162 drawing from a reservoir 164 and direct-ing fluid under pressure into a suitable flow control valve 166, illustrated in the preferred form as a two-position valve which may be of the spool valve type. Control valve 166 is actuated between its two positions by a suitable valve operating mechanism 168. This valve operating mechanism may be operated responsive to engine speed by a suitable governors type control, or may be actuated manually by the operator.

The camshaft 128 is illustrated in FIG. 12 at an axial shift position for relatively low speed engine operation in which the lobes 170 are moved in a relationship with their associated cam followers, not shown, similar to that illustrated in FIG. 3. To shift the camshaft to the left as viewed in FIG. 12 for higher speed operation, valve operating mechanism 168 is actuated so that it moves control valve 166 to the position illustrated where it directs fluid under pressure into fitting 160 and advance chamber 148. Fluid pressure within this chamber acts against piston 130 to move the camshaft until bearing 135 abuts boss 150, with fluid in return chamber 146 being expelled through fitting 156 and back through the control valve into reservoir 164. With the camshaft thus shifted to the high speed position moving the lobes in a relationship with their cam followers similar to that of FIG. 2, a reaction force acting in an axial direction to the right will be received from the cam followers as a result of the tapered contour of the lobes and followers. This reaction force will tend to urge the camshaft back to its low speed position shown in FIG. 12. The reaction force thus can be utilized as the means for shifting the camshaft to its low speed position when pressure is relieved in advance chamber 148. To assist this return force and provide a more positive shift, valve operating mechanism 168 is actuated to move control valve 166 to its second position directing fluid under pressure into fitting 156 and return chamber 146. Fluid pressure in this chamber acts against the end of camshaft bearing 135 with fluid from advance chamber 148 being expelled through fitting 160 and back through the control valve into reservoir 164. Alternate hydraulic shift arrangements could include that of providing hydraulic actuators at each end of the camshaft with differential pressure between the actuators controlled by suitable valving to effect the shift, or a single action hydraulic actuator could be provided at either end of the camshaft with a suitable spring and thrust washer arrangement provided at the other end supplying the restoring force.

Figure 8:
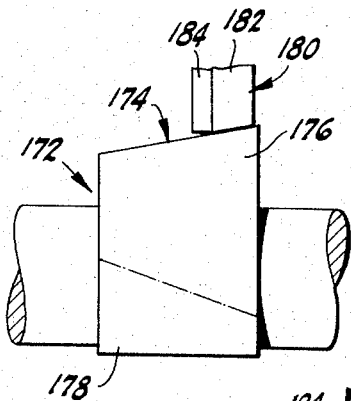
FIG. 8 is a fragmentary view of another embodiment of the invention illustrating a camshaft lobe formed with a heel portion of oblong cylindrical configuration axially shifted to a position with respect to a cam follower for high speed engine operation.
Figure 9:
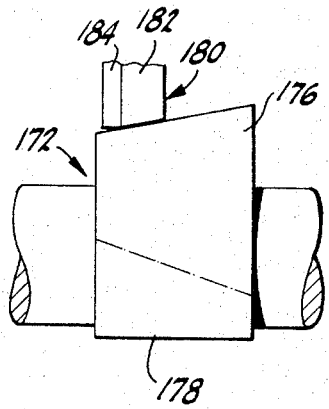
FIG. 9 is a view similar to FIG. 8 illustrating the cam shaft shifted to a position thereof for relatively low speed engine operation.

FIGS. 8 and 9 illustrate another embodiment of the invention providing a camshaft 172 specially adapted for use in internal combustion engines having mechanical cam follower arrangements which do not incorporate hydraulic lifters or hydraulic lash adjustors provided for eliminating clearance in the valve train while compensating the linear expansion and contraction due to temperature changes. In cam followers without provision for lash adjustment the lobes 174 of the camshaft would be ground into two distinct portions, i.e. a ramp portion 176 and a heel portion 178. The ramp portion 176 is formed with a peripheral ramp surface which varies in axial extent between the different ramp contours for varying valve duration and overlap periods when the camshaft is axially shifted with respect to the roller 180 of the cam follower. The roller 180 in turn is formed in two portions i.e. a tapered portion 182 formed to generally match the contour of ramp portion 176, and a cylindrical portion 184. The lobe ramp portion 176 and tapered roller portion 182 would thus be formed in the manner explained in relation to the lobe of FIGS. 3 - 4. The heel portion 178 is ground to define a peripheral surface of revolution formed by a line generally parallel to and moving in an arc about the camshaft axis, and this surface can be described as an oblated cylinder.

Figure 10:
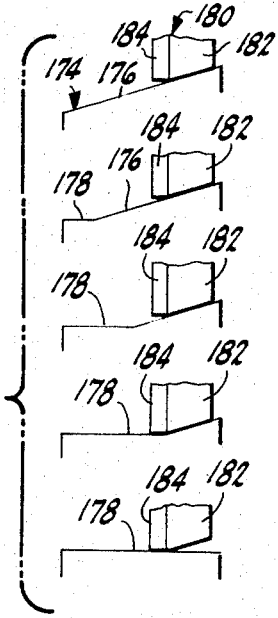
FIG. 10 is a schematic representation of the relationship between the cam lobe and follower in the cam shaft position of FIG. 8 at different positions of rotation thereof.

The heel portion 178 is effective to turn against the cylindrical portion 184 of the follower roller as the valves, whether exhaust or intake, are in closed position and thereby carry the resulting relatively light load. As the valves are operated and the spring and acceleration loads on the valve train greatly increase, the tapered ramp portion 176 is moved into engagement with the tapered portion 182 of the follower roller. Thus, the tapered ramp portion carries the heavier loads for valve opening throughout the extent of axial shift of the camshaft, while the cylindrical heel portion 178 carries the lighter loads when the valves are closed. The schematic diagram of FIG. 10 illustrates step wise movement of the lobe 174 with respect to follower roller 180 throughout approximately one half turn of the camshaft, and with the camshaft shifted for high speed engine operation. In the top illustration of FIG. 10 ramp portion 176 is turning against roller tapered portion 182 so that the valve is moved to fully open position. The next two lower illustrations show continued steps of camshaft revolution with the advance of cylindrical heel portion 178 as the valve starts to close. The fourth illustration down shows the transition position of the lobe at which the flat portion 184 of the roller begins to contact heel portion 178. The bottom illustration shows roller flat portion 184 riding completely on heel portion 178 with the roller tapered portion 182 out of contact completely with the lobe.

Figure 13:
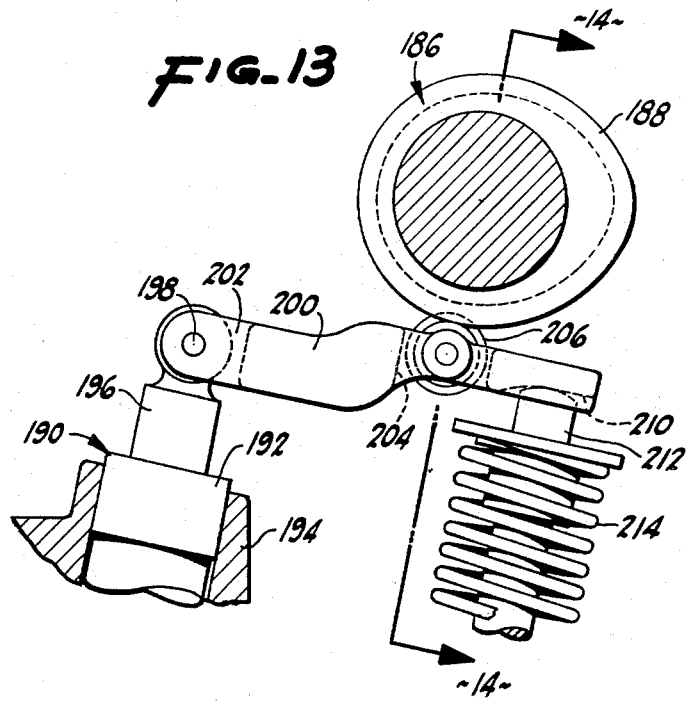
FIG. 13 is a fragmentary, partially sectioned view of another embodiment of the invention specially adapted for use with an overhead cam type engine.
Figure 14:
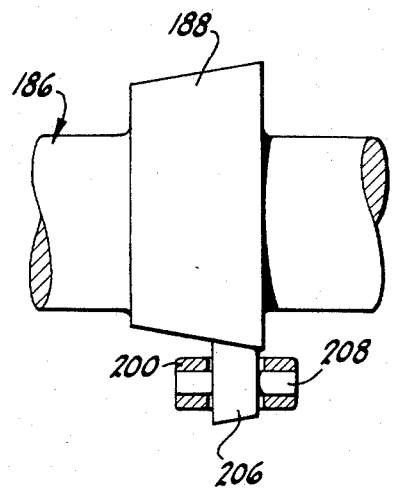
FIG. 14 is a fragmentary sectional view taken along the line 14—14 of FIG. 13.

FIGS. 13 and 14 illustrate another embodiment of the invention specially adapted for use with an engine incorporating an overhead cam arrangement. In this embodiment a camshaft 186 is journalled on the cylinder head and is driven by suitable means such as a drive belt, not shown, from the crankshaft. A plurality of lobes 188 are formed on the camshaft with peripheral ramp surfaces which vary in axial extent to define the varied ramp contours in the manner explained above. Means for axially shifting the camshaft is provided in the manner explained above in relation to either of the FIGS. 11 or 12, for example.

An hydraulic lash adjustor 190 provided at each of the lobe positions includes a body member 192 mounted within cylinder head 194 with a plunger 196 extending outwardly to provide a fulcrum point at the laterally extending pins 198. A body of oil is contained within the lash adjustor preventing the plunger from moving downwardly except at a controlled rate. A cam follower arm 200 is formed with a clevis portion 202 for pivotal connection with the fulcrum pins 198. The follower arm carries within an opening 204 a tapered roller 206 mounted on axle 208, as best illustrated in FIG. 14. The peripheral surface of roller 206 generally conforms with the ramp surface of lobe 188 for rolling engagement therewith throughout the range of axial shifting of the camshaft. The fulcrum arm has an outward projection formed with a recessed pivot seat or socket 210 which bears against the rounded end of valve stem 212. The valve stem carries a return spring 214 normally urging the valve to its seated position. The side flanks of the pivot seat 210 prevent the follower from moving sideways with respect to the valve stem.

In the operation of the embodiment of FIGS. 13 - 14 it will be assumed that camshaft 186 is axially shifted to the position of FIG. 14 for high speed engine operations. As the camshaft turns the ramp contour of relatively long duration and overlap periods is moved against tapered roller 206 which in turn pivots follower arm 200 about pins 198 on the lash adjustor. This acts as a lever against valve stem 212 for moving the valve to open position. As the heel of the lobe moves into relationship with the roller follower return spring 214 acts to move the valve to closed position. Expansion and contraction in the valve train due to temperature changes is accommodated for by a controlled leakage of oil within the body of lash adjustor 190.

It will be realized from the foregoing that there has been provided novel method and apparatus for the control of valve operation in an internal combustion engine. The relationship between the opening and closing of the intake and exhaust valves including duration and overlap periods is varied throughout the speed range of the engine to closely match the varying charge induction and exhaust scavenging requirements. The invention obviates the problems and limitations inherent with conventional cam designs in which valve opening and closing timing is a poor compromise between the theoretically exact settings. Thus, in conventional engines at low engine speeds an intake valve both opens too soon and closes too late for optimum efficiency because the charge tends to be pushed back into the intake manifold. And at high engine speeds the intake valve should open sooner and close later, in relation to the ideal, to take full advantage of the effects of the inertia of the incoming charge. For conventional exhaust valve timing at low engine speeds the exhaust opens too soon permitting too much gas pressure to escape rather than act on the piston, and the exhaust closes too late so that part of the exhaust gasses are drawn back into the cylinder on the intake stroke. At high engine speeds the exhaust opens too late requiring the ascending piston to expand energy in pushing out the extra exhaust gasses, and the exhaust closes too soon without taking full advantage of the effects of the inertia of the exhausting gasses in both scavenging the chamber and creating a low pressure into which the intake charge can be drawn as the piston descends on the intake stroke. In applican's invention the foregoing valve opening and closing variables are controlled in a manner which makes it possible to closely match the theoretical engine requirements.

While the foregoing embodiments are at present considered to be preferred it will be understood that numerous variations and modifications may be made therein by those skilled in the art and it is intended to cover in the claims all such variations and modifications as fall within the true spirit and scope of the invention.

I claim:

1. Apparatus for use in an internal combustion engine having at least one combustion chamber with associated intake and exhaust valve means controlling the flow of intake charges and exhaust gasses into and from each chamber, including intake valve operating means to open said intake valve means for a predetermined lift duration period to induct a charge into said chamber for an intake phase, exhaust valve operating means to open said exhaust valve means for a predetermined lift duration period to scavenge exhaust gasses from the chamber for an exhaust phase, valve control means to cause a portion of the duration period of the said intake valve means to coincide with a portion of the duration period of said exhaust valve means for establishing an overlap period between termination of the exhaust phase and initiation of the intake phase, said valve control means including at least one camshaft driven in time relationship with said engine speed, said camshaft being formed with a plurality of intake and exhaust lobes, said lobes being formed into diametrically opposed ramp and heel portions, said ramp portions defining peripheral ramp surfaces which vary in axial extent between first ramp contours following a predetermined path for engine start-up and low engine speed operation and second ramp contours following a second predetermined path for high speed engine operation, said heel portion defining a peripheral surface of revolution generated by a line parallel with and moving in an arc about said camshaft, said intake valve operating means including cam follower means to follow said intake lobes between said first and second ramp contours thereof to operate said intake valve means, said exhaust valve operating means including cam follower means to follow said exhaust lobes between said first and second ramp contours thereof to operate said exhaust valves, said cam follower means for said intake and exhaust valve operating means further including roller members mounted for rotation above respective axes generally parallel with said camshaft axis, said roller members being formed with a first substantially frusto conical peripheral surface conforming generally to the mating surface of said ramp portion of a respective lobe for rolling engagement therewith during opening of a respective valve, and the roller members being formed with a second substantially cylindrical peripheral surface mating with the surface of the heel portion of a respective lobe for rolling engagement therewith while the associated valve is closed.

* * * * *